United States Patent
De Bruijn et al.

(10) Patent No.: US 10,687,403 B2
(45) Date of Patent: Jun. 16, 2020

(54) ADAPTIVE LIGHTING SYSTEM FOR A MIRROR COMPONENT AND A METHOD OF CONTROLLING AN ADAPTIVE LIGHTING SYSTEM

(71) Applicant: KONINKLIJKE PHILIPS N.V., Eindhoven (NL)

(72) Inventors: Frederik Jan De Bruijn, Eindhoven (NL); Vincentius Paulus Buil, Veldhoven (NL); Karl Catharina Van Bree, Eindhoven (NL); Leo Jan Velthoven, Winteire (NL); Daniel Willem Elisabeth Schobben, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 61 days.

(21) Appl. No.: 16/086,859

(22) PCT Filed: Mar. 16, 2017

(86) PCT No.: PCT/EP2017/056187
§ 371 (c)(1),
(2) Date: Sep. 20, 2018

(87) PCT Pub. No.: WO2017/162504
PCT Pub. Date: Sep. 28, 2017

(65) Prior Publication Data
US 2019/0132927 A1    May 2, 2019

(30) Foreign Application Priority Data
Mar. 21, 2016 (EP) ..................................... 16161319

(51) Int. Cl.
*H05B 47/105* (2020.01)
*A47G 1/02* (2006.01)
(Continued)

(52) U.S. Cl.
CPC .......... *H05B 47/105* (2020.01); *A45D 42/10* (2013.01); *A47G 1/02* (2013.01); *F21V 33/004* (2013.01);
(Continued)

(58) Field of Classification Search
CPC ........ A45D 42/10; A47G 1/02; F21V 33/004; G06F 3/012; G06F 3/013; G06K 9/00362;
(Continued)

(56) References Cited

U.S. PATENT DOCUMENTS 8,880,865 B2    11/2014   Abernethy et al.
9,237,844 B2    1/2016    De Bruijn et al.
(Continued)

FOREIGN PATENT DOCUMENTS

CN       202890966       4/2013
DE       202015100059    2/2015
(Continued)

OTHER PUBLICATIONS

Light Mirror on the App Store; Advertisement for a Lighted Mirror Application for iOS Devices, downloaded at http://itunes.apple.com/us/app/light-mirror/id396466213?mt=8, Originally Downloaded Beforej Feb. 2016, 2 Pages.
(Continued)

*Primary Examiner* — Peter D Le

(57) ABSTRACT

An adaptive lighting system (100), a (virtual) mirror arrangement, a method of controlling light sources of an adaptive light sources, a method of controlling a virtual mirror and a computer program product are provided. The adaptive lighting system is for a mirror component that is configured to show a mirror image of the user at the mirror surface of the mirror component. The adaptive lighting system comprises a plurality of individually controllable light sources (111 . . . 119), a sensor (102), and a controller
(Continued)

(104). The sensor detects a relative orientation of the head of the user with respect to the mirror surface. The controller generates control signals (121 ... 129) for the individually controllable light sources on the basis of the sensor signal. The controller generates the control signals to obtain a lower emission of light towards eyes of the user if the sensor signal indicates that the head is turned left sidewards, upwards, right sidewards and/or downwards.

15 Claims, 5 Drawing Sheets

(51) Int. Cl.
| | |
|---|---|
| A45D 42/10 | (2006.01) |
| H05B 47/11 | (2020.01) |
| G06T 7/70 | (2017.01) |
| F21V 33/00 | (2006.01) |
| G06F 3/01 | (2006.01) |
| G06K 9/00 | (2006.01) |
| G06T 7/50 | (2017.01) |
| G06T 7/20 | (2017.01) |

(52) U.S. Cl.
CPC ......... G06F 3/012 (2013.01); G06K 9/00362 (2013.01); G06T 7/70 (2017.01); H05B 47/11 (2020.01); G06F 3/013 (2013.01); G06T 7/20 (2013.01); G06T 7/50 (2017.01); G06T 2207/30196 (2013.01); Y02B 20/46 (2013.01)

(58) Field of Classification Search
CPC ... G06T 2207/30196; G06T 7/20; G06T 7/50; G06T 7/70; H05B 47/105; H05B 47/11; Y02B 20/46
See application file for complete search history.

(56) References Cited

U.S. PATENT DOCUMENTS

| | | | | |
|---|---|---|---|---|
| 10,018,841 | B1* | 7/2018 | Chen | G02B 27/0101 |
| 10,061,976 | B2* | 8/2018 | Bludau | G03B 15/03 |
| 10,545,340 | B2* | 1/2020 | Ouderkirk | G02B 5/3083 |
| 2003/0142041 | A1* | 7/2003 | Barlow | A61B 3/113 345/8 |
| 2003/0194111 | A1* | 10/2003 | Kano | H04N 1/04 382/112 |
| 2006/0050356 | A1* | 3/2006 | Varaprasad | B60R 1/12 359/265 |
| 2009/0284599 | A1* | 11/2009 | Wagner | B60R 1/00 348/148 |
| 2009/0323191 | A1* | 12/2009 | Yamamura | B41J 2/451 359/619 |
| 2010/0270953 | A1 | 10/2010 | Hente et al. | |
| 2011/0134205 | A1* | 6/2011 | Arney | H04N 7/144 348/14.08 |
| 2011/0140606 | A1* | 6/2011 | DeLine | B60K 35/00 315/82 |
| 2012/0169582 | A1* | 7/2012 | Tschirhart | G02B 27/01 345/156 |
| 2012/0176296 | A1* | 7/2012 | Border | G02B 30/34 345/8 |
| 2012/0242560 | A1* | 9/2012 | Nakada | G09G 3/3406 345/8 |
| 2013/0222764 | A1* | 8/2013 | Thompson | A61B 3/103 351/209 |
| 2013/0242404 | A1* | 9/2013 | Kobayashi | G02B 27/0101 359/630 |
| 2013/0278497 | A1* | 10/2013 | Takagi | G06F 3/012 345/156 |
| 2014/0002796 | A1* | 1/2014 | Marcos Munoz | A61B 5/005 351/206 |
| 2014/0091988 | A1* | 4/2014 | Masuda | G02B 27/0149 345/7 |
| 2014/0125579 | A1* | 5/2014 | Yamamoto | G02B 27/017 345/156 |
| 2014/0139404 | A1* | 5/2014 | Takeda | G02B 27/0172 345/8 |
| 2014/0160019 | A1 | 6/2014 | Anda et al. | |
| 2014/0320023 | A1 | 10/2014 | Cannon et al. | |
| 2015/0262288 | A1 | 9/2015 | Cypher et al. | |
| 2015/0367859 | A1* | 12/2015 | Roth | B60K 37/00 701/36 |
| 2016/0054802 | A1* | 2/2016 | Dickerson | G06F 3/0488 345/158 |
| 2016/0081546 | A1* | 3/2016 | MacDougall | A61B 3/113 351/210 |
| 2016/0170482 | A1* | 6/2016 | Yajima | G06F 3/012 345/8 |
| 2016/0219272 | A1* | 7/2016 | Fujimaki | H04N 13/344 |
| 2017/0010850 | A1* | 1/2017 | Kobayashi | G06F 3/1454 |
| 2017/0164719 | A1* | 6/2017 | Wheeler | A45D 42/10 |
| 2018/0252913 | A1* | 9/2018 | Tardif | G02B 27/0093 |
| 2018/0301036 | A1* | 10/2018 | Villavicencio | B60W 40/10 |

FOREIGN PATENT DOCUMENTS

| | | |
|---|---|---|
| EP | 1792553 A2 | 6/2007 |
| EP | 2515526 A2 | 10/2012 |
| JP | 2008018058 A | 1/2008 |
| JP | 2008073174 A | 4/2008 |
| KR | 1020140104809 | 8/2014 |
| WO | 2007104729 A1 | 9/2007 |
| WO | 2010026775 A1 | 8/2010 |
| WO | 2010095075 A1 | 8/2010 |
| WO | 2011158143 A1 | 12/2011 |

OTHER PUBLICATIONS

Barbie Digital Makeover-Smashing Ideas, Advertisement for Digital Makeover for iPAD, downloaded at http://smashingideas.com/workbarbie-digital-makeover/; Originally Downloaded Before Feb. 2016, 8 Page Document.

Simple Human: Advertisement for Lighted Vanity Sensor Makeup Mirrors, Downloaded at www.simmplehuman.com/sensor-mirrors?gclid, Originally Downloaded Prior to Feb. 2016, 2 Pages.

"Light Your Home"; American Lighting Association: Advertisement for Home Lighting, Copyright 2018, Downloaded From www.americanlightingassco.com, 12 Pages.

Ljusgiganten.SE, Swedish Lighting Company Advertising for Automobiles, Downloaded From www.lumiblade-experience.com/livingshapes%3Fslide=1.html, Copyright 2017.

* cited by examiner (A)　(B)

ADAPTIVE LIGHTING SYSTEM FOR A MIRROR COMPONENT AND A METHOD OF CONTROLLING AN ADAPTIVE LIGHTING SYSTEM

CROSS-REFERENCE TO PRIOR APPLICATIONS

This application is the U.S. National Phase application under 35 U.S.C. § 371 of International Application No. PCT/EP2017/056187, filed on Mar. 16, 2017, which claims the benefit of European Patent Application No. 16161319.5, filed on Mar. 21, 2016. These applications are hereby incorporated by reference herein.

FIELD OF THE INVENTION

The invention relates to an adaptive lighting system for a mirror component being configured to show a mirror image of a user at a mirror surface of the mirror component. The mirror component may be a mirror and may also be a virtual mirror in which a camera obtains an image of a face of a person being arranged in front of a display and the display presents the obtained image as the mirror image.

The invention further relates to a mirror arrangement and to a virtual mirror arrangement.

The invention also relates to a method of controlling light sources of an adaptive lighting system for a mirror component being configured to show a mirror image of a user at a mirror surface of the mirror component, to a method of controlling a virtual mirror and to a computer program product for controlling light sources of an adaptive lighting system for a mirror component.

BACKGROUND OF THE INVENTION

Today many mirrors or virtual mirrors (e.g. the Barbie digital makeover children's toy) have light sources provided near the edges of the mirror. There are also many mirrors that have an integrated lighting system. For example, light sources are provided behind a half-translucent mirror, and in operation they emit light through the half-translucent mirror directed a user in front of the mirror. In particular, it is useful to integrate a lighting system in a vanity mirror that is being used by users to do their makeup, to do their hair or to shave. The use case of such vanity mirror requires that the face of the user is well-illuminated. However, while doing their makeup or while shaving, the user quite often comes relatively close to the vanity mirror and then the user may experience glare. Glare is a sensation when one is not able to see well because of a high amount of bright light that falls into the eyes. Glare is not only a disability to see well, it is also a discomfort that is being experienced by the user when a high amount of bright light is received from one or more light sources.

WO2011158143A1 discloses a display and lighting arrangement comprising a display unit, a sensor system, a control unit and a lighting system, wherein the sensor system is configured to sense a person in a predetermined area and to generate a corresponding sensor system signal. The lighting system comprises a first light source configured to provide front face light to the person and a second light source configured to provide top light to the person in the redetermined area. The control unit is configured to derive a person feature from the sensor system signal and to control, based on the person feature, the light of the first light source and the light of the second light source.

EP2515526A2 discloses An electronic display includes an image capture and analysis feature. The display may be configured to detect a user parameter of a user positioned before the display. The device can analyze the image and dynamically adjust fonts and/or user preference settings, and/or provide ergonomic analysis. A mobile video-conferencing device includes a camera built into the device housing and configured to capture, detect and recognize images of a user who is viewing the display. An infrared (IR) light source and IR sensitive image sensor may be used to capture images of the user under low-light, no light or uneven light conditions to enhance and transmit to a remote video conference participant an image of the user's face.

US20140160019A1 discloses a method for enhancing user interaction with mobile electronic devices is presented. The method includes determining screen orientation on the device by first detecting the presence of a user using data captured by a camera of the portable electronic device. The method further includes searching the data from the camera for a plurality of physical characteristics of the user if a user is detected. The method also includes determining a facial orientation of the user based on information regarding at least one physical characteristic of the user determined from the data. Finally, the method includes setting a screen orientation of a display device of the portable electronic device based on the determined facial orientation of the user.

Japanese patent application JP2008018058 discloses a mirror device that can illuminate a face in front of the mirror at a sufficient level while, at the same time, preventing the user from experiencing glare. A sensor measures a distance between the mirror and the user in front of the mirror. A control section uses the measured distance for turning on or off the rows of light emitting panels provided near a circumference of the mirror. Although the light emission is controlled on the basis of a distance between the mirror and the user in front of the mirror, there are still situations in which the user experiences the glare.

SUMMARY OF THE INVENTION

It is an object of the invention to provide an adaptive lighting system for a mirror component that is more convenient for a user.

For this purpose, according to an aspect of the invention and as defined in the claims, an adaptive lighting system for a mirror component configured to show a mirror image of a user at a mirror surface is provided.

For this purpose, according to a further aspect of the invention and as defined in the claims, a method of controlling light sources of an adaptive lighting system for a mirror component configured to show a mirror image of a user at a mirror surface is provided.

For this purpose, according to other aspects of the invention and as defined in the claims, a mirror arrangement, a virtual mirror arrangement, a method of controlling a virtual mirror and a computer program product are provided.

The adaptive lighting system for the mirror component that is configured to show the mirror image of the user at the mirror surface of the mirror component according to the aspect of the invention comprises a plurality of individually controllable light sources, a sensor, and a controller. The plurality of individually controllable light sources are positioned at positions at or near at least a portion of a circumference of the mirror surface or are positioned behind a half translucent mirror surface. The light sources are arranged to emit, in use, light towards a head of the user being in front of the mirror surface. The sensor detects a relative orientation of the head of the user with respect to the mirror surface. The sensor provides a sensor signal indicating whether the head of the user is turned into a specific direction with respect to the mirror surface. The specific direction comprises at least one of: the head is turned in an upwards or downwards direction with respect to the mirror surface, the head is turned in a left sideward or a right sideward direction and the head is arranged towards the mirror surface. The controller generates control signals for the individually controllable light sources on the basis of the sensor signal. The controller generates the control signals to obtain a lower emission of light towards eyes of the user if the sensor signal indicates that the head is turned left sidewards, upwards, right sidewards and/or downwards.

The method of controlling light sources of an adaptive lighting system for a mirror component configured to show a mirror image of a user at a mirror surface of the mirror component according to the further aspect of the invention comprises i) detecting a relative orientation of a head of the user with respect to the mirror surface and generating a sensor signal indicating whether the head of the user is turned in a specific direction with respect to the mirror surface, the specific direction comprises at least one of: the head is turned in an upwards or downwards direction with respect to the mirror surface, the head is turned in a left sideward or a right sideward direction and the head is arranged towards the mirror surface, ii) generating control signals for individually controllable light sources on the basis of the sensor signal, wherein the generation of the control signals is performed such that a lower emission of light towards the eyes of the user is obtained if the sensor signal indicates that the head is turned left sidewards, upwards, right sidewards and/or downwards The features of the above provided adaptive lighting system and method reduce the glare experience that may be the result of light emitted by light sources provided at or near the circumference of the mirror surface. In particular, if the user moves his head in an upwards, downwards, left sideward or right sideward direction, the eyes move to a position where they are closer to a portion of the light sources provided at or near the top, bottom, left side or right side, respectively, of the mirror surface. The user looks most probably with his eyes to the mirror and then receives a relatively high amount of light from the light sources that are closer to his eyes. The adaptive lighting system and method automatically reduce the amount of light emitted towards the eyes depending on the orientation of the head and, thus, thereby substantially reducing glare. This is achieved by reducing the amount light emitted by the light sources that are closest to his eyes. Compared to the known mirrors with integrated light in which the illumination level is controlled on the basis of a distance between the user and the mirror, the adaptive lighting system and the method provide the effect that glare is prevented in case the head of the user is turned with respect to the mirror surface.

In accordance with an embodiment, the controller is configured to generate the control signals indicating that a portion of the light sources that are closest to the eyes of the user have to emit less light if the head is turned left sidewards, upwards, right sidewards and/or downwards and the light emitted by these light sources is reduced. Thus, appropriate light sources are dimmed and thereby less light is emitted towards the eyes of the user.

In accordance with another embodiment, it may be that light sources are adapted to control at least one of a width of an emitted light beam and a direction of the emitted light beam. For example, the light sources comprise an optical element that can be moved with respect to an element that actually emits the light based on control signals. Thereby characteristics of the emitted light beam can be controlled. Then the controller may be configured to generate the control signals indicating that a portion of the light sources that emit, in use, light towards the eyes of the user have to adapt at least one of the direction of the emitted light beam and the width of the emitted light beam to obtain a lower light emission towards the eyes of the user. Thus, in this embodiment not necessarily the amount of light emitted by the portion of the light sources is adapted, but characteristics of the emitted light beam are changed to obtain the lower light emission towards the eyes of the user. For example, a direction of the emitted light beam may be changed, such that, the emitted light beam does not illuminate the eyes of the user. For example, the width of the emitted light beam may be enlarged such that the amount of light emitted to the eyes of the user reduces, or the width of the emitted light beam is relatively small, such that, the relatively small emitted light beam does not illuminate the eyes of the user. It is to be noted that the controlling of characteristics of the light beam may be combined with controlling the amount of light emitted by the light source.

Optionally, the controller is further configured to generate the control signals indicating that opposite light sources have to emit more light towards the head. The opposite light sources are a subset of the plurality of individually controllable light sources that are positioned along a circumference of the mirror surface, and are arranged opposite to the light sources that are closest to the eyes of the user. Thereby, an area of the face of the user that is directly facing towards the mirror surface is better illuminated and, thus, the user is better able to see and/or to inspect, that area of the face. This optional embodiment does not result in an increased sensation of glare because most of the light emitted by the opposite light sources is not emitted directly to the eyes of the user. In line with an embodiment discussed above, the illumination level of the opposite light sources may be increased. Additionally, or alternatively, in line with an embodiment discussed above and if the light sources are able to adapt characteristics of their emitted light beam, the opposite light sources may be controlled to adapt the characteristics of their emitted light beams, such that, more light impinges on the head of the user.

Optionally, the controller is further configured to store user profiles that include at least one characteristic of the user and a glare sensitivity indicator that belong to the user. The sensor is further configured to detect the at least one characteristic of the user if the user is in front of the mirror component and to include the detected information in the sensor signal. The controller is further configured to select a stored user profile based on the detected characteristics of the user as provided by the control signal, and to use the glare sensitivity indicator of the selected user profile to generate the control signals. The control signals indicate a larger reduction of the emission of light towards the eyes of the user, if the glare sensitivity indicator is relatively high, and a smaller reduction of the emission of light towards the eyes of the user, if the glare sensitivity indicator is relatively low. Some people are more sensitive to glare than other people and this embodiment provides means to take that into account. The sensitivity indicator may be the age of the user, because it is known that the older the user is, the more sensitive the user is to glare. The sensitivity indicator may also be a number that is stored as the result of an input received from the user and may thus reflect the sensitivity of that unique person.

Which characteristic of the user is stored strongly depends on how the sensor is able to detect the characteristics of the user. In an embodiment, the sensor comprises a camera and video recognition software and the characteristic of the user are elements of the face of the user and face recognition is used to detect which person is in front of the mirror surface. In an embodiment, each user is assigned a unique identifier that can be received or electronically detected (e.g. by near field communication technology) while the user wears an electronically readable tag, or if the user wears a transmitter that transmits the identifier, the sensory may comprise a receiver for receiving the identifier.

Optionally, the sensor is further configured to detect a distance between the user that is present in front of the mirror component and the controller is further configured to generate control signals indicating an amount of light to be emitted by the light sources based on the detected distance. For example, if the user is in between a first and second distance from the mirror, the control signals indicate that the light sources have to emit a relatively high amount of light. If subsequently the eyes of the user become relatively close to the mirror, for example, when the user is between a third and the second distance from the mirror, the control signals indicate that the light sources have to emit a medium amount of light to prevent the glare. It may also be that when a user is relatively far away, and/or no user is detected at all, then the control signals indicate that the light sources must be switched off. This optional embodiment provide a better user experience because the amount of light emitted is automatically adapted and may be controlled such that, based on the distance, the glare is prevented.

Optionally, the sensor comprises a camera and an image processing unit. The camera is arranged to and configured to obtain images of the head of the user if the user is in front of the mirror component. The image processing unit is coupled to the camera and is configured to recognize the head of the user in the images, to detect a relative orientation of the head with respect to the mirror surface in the images and to generate the sensor signal accordingly. Thus, by means of image recognition techniques the relative orientation of the head with respect to the mirror surface can be accurately determined.

Optionally, the adaptive lighting system further comprises a lower power user presence sensor for detecting whether a user is present in front of the mirror component and wherein the sensor and/or the controller is switched on or off based on the detection of the user in front of the mirror component. If the user is present in front of the mirror component, the sensor and/or the controller are switched on. If the user is not present in front of the mirror component, the sensor and/or the controller are switched off and thereby the adaptive lighting system enters an energy saving mode. This may also result in an improvement of the user experience because the user does not have to switch on or switch off the mirror component. The low power user presence sensor uses, for example, less than 500 milliwatt, less than 100 milliwatt, or even less than 10 milliwatt. The term low power at least refers to the fact that the power usage of the low power user presence sensor is significantly lower (e.g. 10 times lower or 100 times lower) than the power usage of the sensor and/or the controller.

Optionally, the adaptive lighting system comprises an ambient light level detector for sensing an illumination level of an ambient of the mirror component and the controller is configured to take into account the sensed illumination level while generating the control signals. The control signals indicate a larger reduction of the emission of light towards the eyes of the user if the sensed illumination level is relatively low and a smaller reduction of the emission of the light towards the eyes of the user, if the sensed illumination level is relatively high. If the ambient, which is the environment of the mirror, is well illuminated, users are less sensitive to glare. Then the light sources that are dimmed may emit more light compared to a situation with a lower ambient illumination level to ensure that the user still receives enough light on his face.

According to an aspect of the invention, a mirror arrangement is provided that comprises a mirror and comprises one of the above discussed embodiments of the adaptive lighting system. The mirror component, defined in the embodiments of the adaptive lighting system, is formed by the mirror and the mirror surface, defined in the embodiments of the adaptive lighting system, is formed by a reflective surface of the mirror. The light sources are provided at least close to a portion of a circumference of the mirror. If the mirror is half translucent, the light sources may be provided behind the half translucent mirror, close to the circumference of the mirror. The mirror arrangement has similar embodiments, advantages and effects as the embodiments of the above discussed adaptive lighting system.

According to an aspect of the invention, a virtual mirror arrangement is provided that comprises a display, a camera, a processor and one of the above discussed embodiments of the adaptive lighting system. The camera is arranged to and configured to record images of a space in front of a display. The processor is coupled to the camera and the display. The camera and the processor are configured to implement the functions of the sensor of the adaptive lighting system, in other words, the camera and the processor form the sensor. The display and the processor are also configured to present the images recorded by the camera as the mirror image on at least a portion of the display. The virtual mirror arrangement has similar embodiments, advantages and effects as the embodiments of the above discussed adaptive lighting system.

Optionally, the plurality of individually controllable light sources are provided at or near at least a portion of the circumference of the display. Or, the display and the processor are also configured to use portions of the display being located at or near the circumference of the display by the plurality of individually controllable light sources. In particular, pixels arranged near the edge (near the circumference) of the display can be controlled to emit white light of a controllable light intensity. In theory, each pixel can be individually controlled and it may also be that the amount of light emitted by the groups of pixels can be controlled.

According to an aspect of the invention, a method of controlling light sources of an adaptive lighting system for a mirror component is provided. The mirror component is configured to show a mirror image of a user at a mirror surface of the mirror component. The method comprises: i) detecting a relative orientation of the head of the user with respect to the mirror surface and generating a sensor signal indicating whether the head of the user is turned in a specific direction with respect to the mirror surface, the specific direction comprises at least one of: the head is turned in an upwards or downwards direction with respect to the mirror surface, the head is turned in a left sideward or a right sideward direction, and the head is arranged towards the mirror surface, ii) generating control signals for the individually controllable light sources on the basis of the sensor signal, wherein the generation of the control signals is performed such that a lower light emission of light towards eyes of the user is obtained if the sensor signal indicates that the head is turned left sidewards, upwards, right sidewards and/or downwards. The method has similar embodiments, advantages and effects as the embodiments of the above discussed adaptive lighting system.

According to an aspect of the invention, a method of controlling a virtual mirror is provided. The method comprises i) an embodiment of the above discussed method of controlling light sources of an adaptive lighting system, ii) obtaining an image of the head of the user in front of a display, the display being arranged to act a mirror surface, iii) presenting the image of the head of the user on a portion of the display, wherein the obtained image of the head is also used in the stage of detecting a relative orientation of the head of the user with respect to the mirror surface. The method has similar embodiments, advantages and effects as the embodiments of the above discussed method of controlling light sources and the above discussed adaptive lighting system.

According to an aspect of the invention, a computer program product for controlling light sources of an adaptive lighting system for a mirror component. The program is operative to cause a processor to perform an embodiment of the above discussed method of controlling light sources of an adaptive lighting system for a mirror component. The computer program product has similar embodiments, advantages and effects as the embodiments of the above discussed method of controlling light sources and the above discussed adaptive lighting system.

According to an aspect of the invention, a computer program for controlling a virtual mirror. The program is operative to cause a processor to perform an embodiment of the above discussed method of controlling a virtual mirror.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of examples in the following description and with reference to the accompanying drawings, in which FIG. 1 schematically shows an embodiment of an adaptive lighting system, FIG. 2 schematically shows an embodiment of a mirror arrangement, FIG. 3 schematically shows an embodiment of a virtual mirror arrangement, FIG. 4 schematically shows a head of a user in front of a mirror, FIG. 5 schematically shows the adaptive lighting system of the mirror arrangement in operation, FIG. 6 schematically shows an embodiment of a method of controlling light sources of the adaptive lighting system and an embodiment of a method of controlling the virtual mirror, and FIG. 7 schematically shows an embodiment of a computer program product. The figures are purely diagrammatic and not drawn to scale. In the Figures, elements which correspond to elements already described may have the same reference numerals.

DETAILED DESCRIPTION OF EMBODIMENTS

Figure 1:
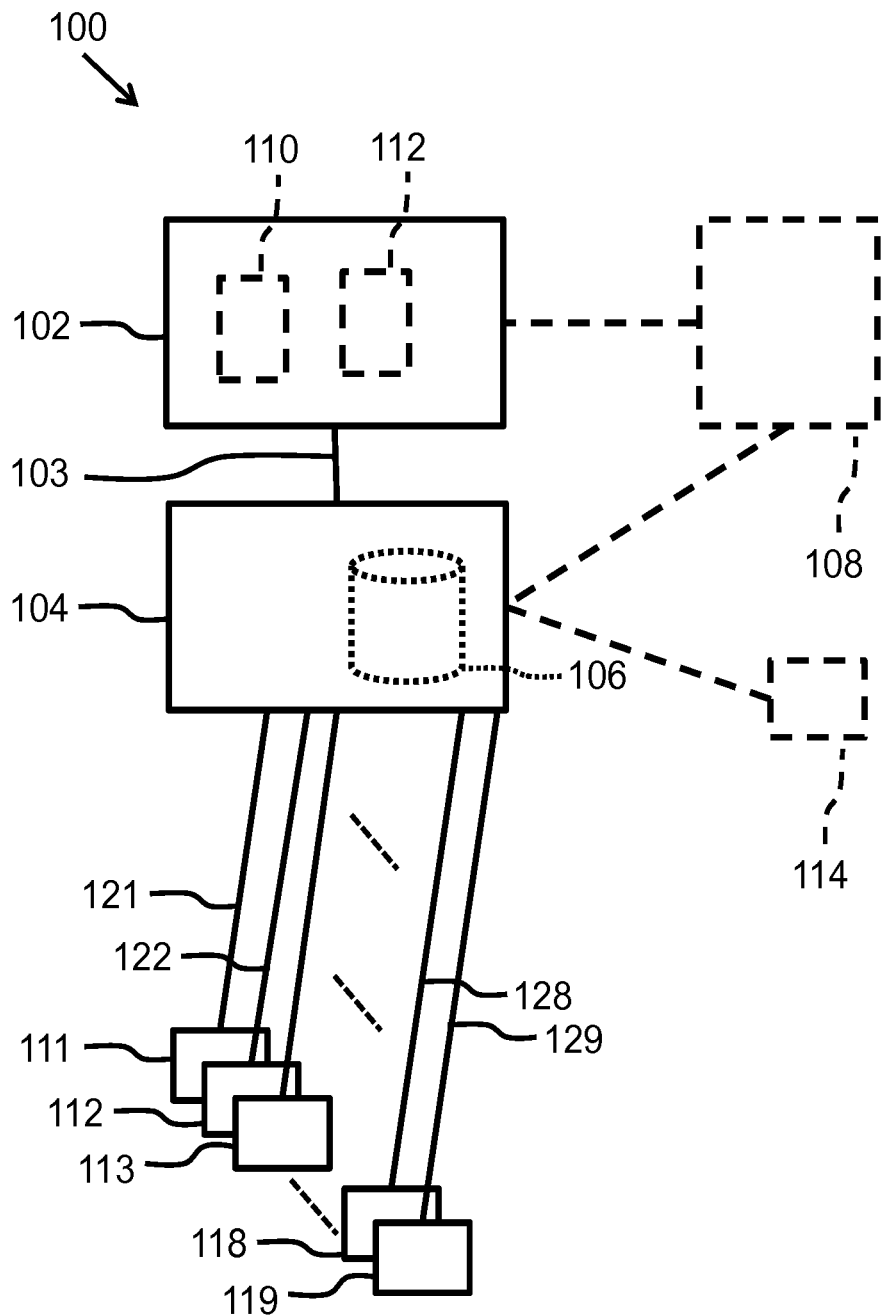

FIG. 1 schematically shows an embodiment of an adaptive lighting system 100 for a mirror component. The mirror component is configured to show a mirror image of a user at a mirror surface of the mirror component. The adaptive lighting system 100 comprises a plurality of individually controllable light source 111 . . . 119, a sensor 102, and a controller 104. In use, the plurality of individually controllable light source 111 . . . 119 are arranged at or near at least a portion of a circumference of the mirror surface such that, if the plurality of individually controllable light sources 111 . . . 119 emit light, the light is emitted towards a head (not shown) of a user that is positioned in front of the mirror surface. At or near the circumference of the mirror surface means that the plurality of individually controllable light source 111 . . . 119 may be arranged around a portion of the mirror surface, or that they may be arranged within the circumference of the mirror surface and are arranged closer to the circumference of the mirror surface than to a center of the mirror surface. The plurality of individually controllable light source 111 . . . 119 may be arranged at a position where they are directly adjacent to the portion of the circumference of the mirror surface.

The plurality of individually controllable light source 111 . . . 119 are controllable, which means that at least the amount of light that an individual light source 111 . . . 119 emits may be controllable. This may be done by means of control signals 121 . . . 129. Each light source 111 . . . 119 may comprise a single light emitter or may comprise a group of light emitters. In an example, the light source 111 . . . 119 are elongated strips that comprise a groups of Light Emitting Diodes. In an example, the light sources 111 . . . 119 comprise one or more Light Emitting Diodes that are optionally provided with luminescent material. Optionally, the light sources 111 . . . 119 are configured to emit substantially white light having a color point close to a black body line of a color space.

Optionally, the light sources 111 . . . 119 are capable of emitting a light beam into a controllable direction and/or a width of the light beam is controllable. Such light source 111 . . . 119 may comprise one or more light emitters and an optical element. For example, the optical element is for example a lens that may be controlled to varying positions with respect to the one or more light emitter and thereby the direction and/or the width of the light beam is controlled.

Any suitable light source may be used that comprises a suitable light emitter, such as, for example, one or more solid state light emitters such as Light Emitting Diodes (LEDS), or a fluorescent lighting tube, one or more incandescent lamps, etc. Each light source may comprise a driving circuit that generates the signal that is provided to the light emitter(s) in dependence of a control signal.

FIG. 1 may suggest that there are 9 light sources 111 . . . 119. However, embodiments of the adaptive lighting system 100 are not limited to 9 light sources only. It is relevant in the context of this document that there are a plurality of light sources that are arranged, in use, at or near a portion of the circumference of the mirror component. For example, in an embodiment a mirror has a light source 111 . . . 119 at its left side, right side and top side a light source.

The sensor 102 is configured to detect a relative orientation of the head of the user with respect to the mirror surface. The sensor 102 is configured to provide a sensor signal 103 that indicates, in use, whether the head of the user is turned in a specific direction with respect to the mirror surface. Instead of the verb "turn", one may read "at least partially rotate". The specific direction comprises at least one of: the head is turned in an upwards or downwards direction with respect to the mirror surface; the head is turned in a left sideward or a right sideward direction; and the head is arranged towards the mirror surface. The head being arranged towards the mirror means that the head is not turned with respect to the mirror surface, or, in other words, the front side of the head faces the mirror surface. The sensor signal 103 may also indicate a combination of directions in which the head is turned, for example, the head may be turned upwards and in the left sideward direction simultaneously. Optionally, the sensor 102 is also configured to detect a distance between the head of the user and the mirror surface.

Figure 4:
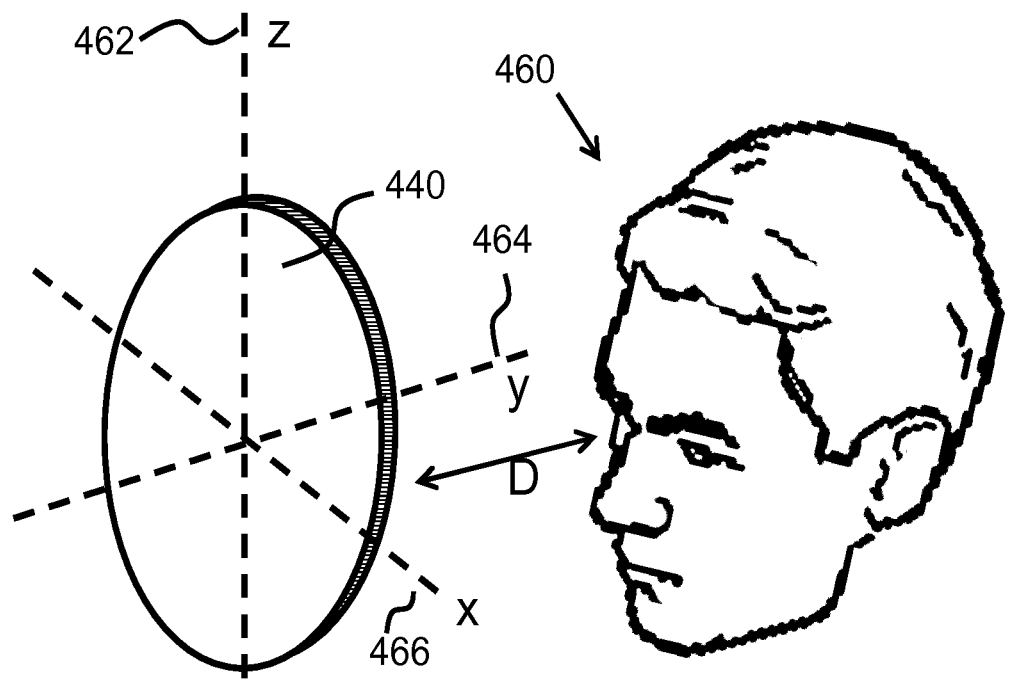

A reference is made to FIG. 4 in which different parameters of the orientation of a head 460 with respect to a mirror 440 are shown. FIG. 4 schematically shows the head 460 of a user in front of the mirror 440. The distance between the mirror 440 and the head 460 is indicated with D. Furthermore, a coordinate system is schematically drawn through the mirror 440. For explanation, it is assumed that the coordinate system is fixed with respect to the mirror 440 and that, if the user moves the head 460, the movement results in different coordinates of elements of the head 460 within the coordinate system. It is noted that the coordinate system may also be fixed with respect to the head 460 of the user and that, if the user moves the head 460 or when the mirror 440 is moved, the mirror 440 obtains different coordinates in the coordinate system.

A z-axis 462 is arranged in a plane of the mirror 440 and is oriented in a top-down direction of the mirror 440. An x-axis 466 is arranged perpendicular to the z-axis 462 and is arranged in the plane of the mirror 440 and is oriented in a left-side direction of the mirror 440. A y-axis 464 is perpendicular to the x-axis 466 and to the z-axis 462, as such, the y-axis 464 is also arranged perpendicular to the mirror 440. A distance of the head 460 of the user with respect to the mirror 440 is defined by the difference in the y-coordinates of the mirror 440 and a front side of the head 460. If the user turns his head 460 into a left sideward direction (which is left sideward seen from the point of view of the user), the head 460 of the user rotates with respect to the z-axis 462 in a counter-clockwise direction. Then, for example, the x-coordinates of the eyes of the user change towards a higher value (assuming that a left portion of the x-axis 466, as seen from the point of view of the user, is a positive part of the x-axis 466), the z-coordinates of the eyes remain the same, and the y-coordinate of the left eye of the user increases and the y-coordinate of the right eye of the user decreases (assuming that a portion of the y-axis 464 pointing into the direction of the head 460 of the user is a positive part of the y-axis 464). If the user turns his head 460 in a right sideward direction (which is right sideward seen from the point of view of the user), the head 460 of the user rotates with respect to the z-axis 462 in a clockwise direction. If the user turns his head 460 in an upwards direction, the head 460 of the user rotates with respect to the x-axis 466 in a clockwise direction. If the user turns his head 460 in a downwards direction, the head 460 of the user rotates with respect to the x-axis 466 in a counter-clockwise direction. Often the terms pitch movement, roll movement, yaw movement are used for forwards oriented objects, such as, for example, the head 460 of the user (and also for, e.g., planes). In FIG. 4, the pitch movement is a rotation around the x-axis 466, which is an upwards/downwards movement of the head 460. In FIG. 4, the yaw movement is a rotation of the head 460 around the z-axis 462 which is a left sidewards/right-sidewards movement of the head 460. In FIG. 4, the roll movement is a rotation around the y-axis 464. An additional type of movement that may be relevant is a translation of the head 460. In translation, the head 460 is not rotated along one of the axis, but moved along one or more of the axes. The upwards and downwards translation are along the z-axis 462 and the left and right translations are along the x-axis 466.

The sensor 102 may comprise a camera 110 that is arranged to obtain an image of the head 460 of the user if the user is in front of the mirror component. For example, the camera 110 is arranged directly above the mirror surface and obtains images of the space in front of the image surface. The camera 110 may also be arranged behind a half translucent mirror surface, or the mirror surface may be interrupted by a transparent region behind which the camera 110 is provided. In the context of this document, it is not important whether the camera 110 is arranged directly adjacent to the mirror surface or behind the mirror surface. The camera 110 may also be arranged at a distance away from the mirror surface. It is always important that the adaptive lighting system 100 knows how the camera 110 is positioned with respect to the mirror surface in order to be able to use the obtained images to detect how the head 460 of the user is oriented with respect to the mirror surface.

The sensor 102 may also comprise an image processing unit 112 that is coupled to the camera 110 for receiving the images obtained by the camera 110. The image processing unit 112 is configured to recognize the head 460 of the user in the images and to detect a relative orientation of the head 460 with respect to the mirror surface. As a result of these recognition of the relative orientation, the image processing unit 112 may generate the sensor signal 103. The image processing unit 112 may also be configured to estimate, on basis of the images received from the camera 110, the distance between the mirror surface and the head 460 of the user. Although in FIG. 1 the image processing unit 112 and the controller 104 are drawn as separate units, the image processing tasks/functions may also be performed by the controller 104 and then the components of the sensor 102 are distributed over the camera 110 and the controller 104.

The image processing unit 110 may comprise algorithms to detect a human face in the images and/or landmarks of a human face in the image. In particular, the landmarks can be used to detect a relative orientation of the head 460 of the user with respect to the mirror surface. Examples of landmarks are eyes, nose, mouth, ears, eyebrows, etc. If, for example, a small portion of a left part of the face and a large part of a right part of the face is present in the images, the image processing unit 112 may decide that the head is turned in a left sideward direction with respect to the mirror surface. If, for example, only a left ear is seen in the images, the image processing unit 112 may detect that the head 460 is turned right in a right sideward direction. The image processing unit 112 may also take into account movements of the head 460 which means that differences between consecutive images are analyzed to detect whether the head 460 moves relatively to the image surface. For example, if in subsequent images the eyes and chin are moving in an upwards direction, and if at the same time the eyes become smaller and a chin becomes larger, the image processing unit 112 may detect that the head 460 is turned into the upwards direction. The image processing unit 112 may use the size of the head 460 in the images as a parameter on the basis of which the distance between the head 460 and the mirror surface is estimated. Detecting the distance of the head 460 of the user with respect to the mirror surface may also be performed with other types of sensors 102 and/or image processing technologies, of which some examples are: capacitive sensing, time of flight measurements in which it is measured, for example, time taken by an electromagnetic wave to travel from the sensor 102 to the head 460 of the user and subsequently from the head 460 of the user to the sensor 102; 3D image recording and 3D image processing techniques; textured illumination; 2D image recording together with depth estimation or detection, for example, cycling the light sources that are switched on quickly such that they appear to be continuously lit and observing with a high capture rate the shadows that are casted on the face from the nose, eye brows, etc.

Alternatively, the sensor 102 may be configured to detect an orientation of the head 460 of the user using two elements arranged at a known position at the head 460 of the user and the orientation is detected based on, for example, generated electromagnetic fields (e.g. generated by the two elements) and/or changes in these generated magnetic fields. For example, the user may wear a pair of glasses that has a left side field generator and a right side field generator and the adaptive lighting system comprises a field sensor arranged at a position near the mirror surface and measures the strengths of the received left and right side fields as a basis for detecting the orientation of the head 460 of the user with respect to the mirror surface. Also the sensor 102 may generate a specific field and elements that have a fixed position near the head of the user influence this specific field and the sensor may detect changes in the field as a result of changing positions of the elements.

Alternatively, the sensor 110 may be configured to detect the gaze direction of the eyes of the user by evaluating the corneal reflection of the light sources mounted around the mirror surfaces. It is known from the field of camera based eye gaze tracking that the point of momentary eye gaze can be estimated by evaluating the center of the pupil against the corneal reflection of the observed scene, more details are provided in US patent U.S. Pat. No. 9,237,844B2. This embodiment has the advantage over traditional gaze tracking solutions that it uses device's embedded active visible light sources. Traditional gaze tracking solutions tend to use active invisible infrared illumination for capturing images of the eye and the infrared corneal reflection. As such, the existing corneal reflection can be used to identify the luminous segment at (or near) the direction of gaze at the mirror.

An alternative embodiment is based on the combination of visible and infrared illumination and visible and infrared image capture, either for face tracking or for eye gaze tracking.

The controller 104 of the adaptive lighting system 100 is coupled to the sensor 102 for receiving the sensor signal 103. The controller 104 is configured to generate a plurality of control signals 121 . . . 129 on the basis of the sensor signal 103. The controller 104 is coupled to the plurality of individually controllable light sources 111 . . . 119 for providing the control signals 121 . . . 129 to the plurality of individually controllable light sources 111 . . . 119. The controller 104 has a knowledge of the position of the plurality of individually controllable light sources 111 . . . 119 with respect to the mirror surface, for example, which of the plurality of light sources 111 . . . 119 are arranged (as seen from the user that is present in front of the mirror component) at a left side of the mirror surface, which of the plurality of light sources 111 . . . 119 are arranged above, which of the plurality of light sources 111 . . . 119 are arranged below, etc. The generation of the control signals 121 . . . 129 is such that, if the sensor signal 103 indicates that the head 460 is turned left sidewards, upwards, right sidewards and/or downwards, the light sources 111 . . . 119 that emit light towards the eyes of the user are controlled to emit less light towards the eyes of the user. In other words, the controlled signals 121 . . . 129 are controlled to obtain a lower emission of light towards the eyes of the user. Thus, if the head 460 is turned in a left sideward direction, the eyes may receive most light from the light sources 111 . . . 119 arranged at the left side of the mirror surface and then the light sources 111 . . . 119 at the left side of the mirror surface are controlled to emit less light. If the head 460 of the user is turned diagonally in a right/downwards direction, the eyes may receive most of the light from the light sources 111 . . . 119 at the bottom/right side of the mirror surface and then these light sources 111 . . . 119 are dimmed. Thereby it is prevented that the user experiences glare, or, at least, if the user experiences glare, the amount of glare is reduced. In short, the controller 104 is configured to control the light sources 111 . . . 119 such that light sources are dimmed that may contribute to the glare.

In an embodiment, the controller 104 is configured to determine which light sources 111 . . . 119 or which group of light sources 111 . . . 119 are closest to the eyes of the user and then these light sources 111 . . . 119 are controlled to emit less light compared to the other light sources 111 . . . 119. For example, the controller 104 determines which 20%, or alternatively which 30%, of the light sources 111 . . . 119 are closest to the eyes.

In an embodiment, the light sources 111 . . . 119 that are opposite to the light sources 111 . . . 119 that have to emit less light, are controlled by the controller 104 to emit more light. In this context, opposite means that, as seen along the circumference of the mirror surface, the light sources 111 . . . 119 that are controlled to emit more light are at the other side of the mirror surface than the light sources 111 . . . 119 that are controlled to emit less light. The opposite light sources 111 . . . 119 do not emit much light directly into the eyes of the user and, thus, an increase of their light emission level does not result in more glare and the increase of their light emission level results in a better illumination of a portion of the face of the user.

In an embodiment, as previously discussed, the plurality of individually controllable light sources 111 . . . 119 may be adapted to control at least one of a width of an emitted light beam and a direction of the emitted light beam based on received control signals 121 . . . 129. In the embodiment, it is assumed that the controller 104 has a knowledge of the relative position of the plurality of individually controllable light sources 111 . . . 119 with respect to the head 460 of the user in front of the mirror surface and optionally of the position of the eyes with respect to the mirror surface. The controller 104 may be configured to generate the control signals 121 . . . 129 indicating that a portion of the light sources 111 . . . 119 that emit, in use, light towards the eyes of the user have to adapt at least one of the direction of the emitted light beam and the width of the emitted light beam to obtain a lower light emission towards the eyes of the user. In line with a previously discussed embodiment, the width and/or the direction of light beam of the light sources 111 . . . 119 closest to the eyes of the user may be adapted to prevent or reduce the experience of glare.

In an embodiment, the controller 104 comprises a data storage 106. The controller 104 may be configured to store, in the data storage 106, user profiles that include at least one characteristic of the user and a glare sensitivity indicator that belongs to the respective user. In this embodiment, the sensor 102 may also be configured to detect the at least one characteristic of the user if the user is in front of the mirror component and the sensor 102 may include at least one detected characteristic in the sensor signal 103. The controller 104 may be configured to select from the data storage 106 a user profile that matches the received detected at least one characteristic of the user (as provided by the control signal 103). The controller 104 may subsequently use the glare sensitivity indicator of the selected user profile to generate the control signals 121 . . . 129. If the glare sensitivity indicator is higher, the light emissions towards the eyes of the user is dimmed more than the situation in which the glare sensitivity indicator is lower.

The at least one characteristic may be a biometric feature of the user that can be recognized from an information that the sensor 102 detects. For example, the biometric feature may be relative positions of landmarks of a human face like, for example, how does a distance between the eyes relate to a distance from one eye to a nose, and to a distance from the nose to a mouth. Such biometric features may be easily detectable when the sensor 102 comprise the camera 110 and the image processing unit 112, as previously discussed, and the image processing unit 112 may be further configured to detect biometric features in the images of the face of the user. It may also be that the user has a (electronic) tag (e.g. as part of his glasses) that can be read by the sensor 102 and that a user ID may be received by the sensor 102. Within a relatively small family, the sensor 102 may also determine which user of the family is standing in front of the mirror by estimating a length of the user and comparing the estimated length with a length value stored in the data storage 106. The user may also provide a specific gesture that is recorded by the camera 110 and recognized by the processing unit 112, and thereby different users may be recognized by assigning different gestures to them. Alternatively, the adaptive lighting system 100 may be coupled to scale positioned in front of the mirror and a measured weight may be used to determine which person of a family is standing in front of the mirror. Alternatively, the adaptive lighting system 100 may be coupled to a toothbrush or shaver that incorporates a fingerprint sensor and a detected fingerprint of the user is used to identify the user in front of the mirror. The glare sensitivity value may be the age of the user, because, often, older people are more sensitive to glare. The glare sensitivity value may also be a value of which a high value, for example, indicates that the user is relatively sensitive to glare.

In an embodiment, the controller 104 may be configured to control the light emission of the plurality of individually controllable light sources 111 . . . 119 based on the detected distance between the user and the mirror component. As discussed previously, the sensor 102 may also be configured to detect such a distance. For example, the controller 104 may switch on the plurality of individually controllable light sources 111 . . . 119 if the user is within a first maximum distance from the mirror component. For example, if the use comes (much) closer and is, for example, closer than a second maximum distance from the mirror component, the light emission of the plurality of individually controllable light sources 111 . . . 119 may be reduced to prevent the glare. If the user is beyond the first maximum distance from the mirror component, the controller 104 may switch off the plurality of individually controllable light sources 111 . . . 119. Thus, in an embodiment, the distance is used for switching on and/or off the plurality of individually controllable light sources 111 . . . 119. In another embodiment, the distance may also be used for glare control, if the user becomes relatively close to the mirror component, the light emission of the plurality of individually controllable light sources 111 . . . 119 is dimmed to prevent the glare.

In this context it is also to be noted that the user may move his head 460 parallel to the mirror surface, for example, in a left sideward translation or a right sideward translation. The sensor 102 may also be configured to detect the translation movements of the head 460 and communicate this information via the sensor signal 103 to the controller 104. The controller 104 may be configured to generate the control signals 121 . . . 129 that reduce a light emission of a subgroup of the plurality of individually controllable light sources 111 . . . 119 that are closest to the eyes of the user. In an embodiment, the sensor 102 and the controller 104 may be configured to operate in a similar way if the head 460 of the user makes a roll movement, which is, as discussed in the context of FIG. 4, a rotation of the head around an axis perpendicular to the mirror surface.

In an embodiment, the adaptive lighting system 100 may comprise a low power user presence sensor 108 that is configured to detect whether a user is present in front of the mirror. Such low power user presence sensor 108 may provide a signal to the controller 104 and/or the sensor 102 in which it indicates whether the user is present in front of the mirror component. The controller 104 and/or the sensor 102 may be configured to enter a lower power mode if the low power user presence sensor 108 detects no user in front of the mirror component, and the controller 104 and/or the sensor 102 may be configured to start their operation if the low power user presence sensor 108 detects the user in front of the mirror component. Thereby energy may be saved because the controller 104 and/or the sensor 102 do not consume much power if no user is present. The low power user presence sensor 108 is configured to consume a relatively low amount of energy, for example, less than 500 milliwatt, less than 100 milliwatt or even less than 10 milliwatt. An example of a low power user presence sensor is a Si1102 Proximity Sensor IC of Silicon Labs—this sensor is based on a reflection of emitted infrared light and the amount of consumed energy by the detection circuitry is less than 1 milliwatt and, in addition, an infrared light emitting Light Emitting Diode needs to be provided which may use, for example, 100 milliwatt. Such a low power user presence sensor 108 may generate, for example, an electromagnetic field and changes in the electromagnetic field are detected to detect the presence of a user. Or such a low power user presence sensor 108 comprises electrodes and changes in the capacitance between the electrodes are detected in order to detect the presence of the user. Often passive infrared (PIR) sensors are used, which are also often used to detect room occupancy. Alternatively, the adaptive lighting system 100 is coupled to a scale that is place in front of the mirror or sensitive floor tiles in a bathroom and these elements are used to detect whether someone is present near the mirror. Alternatively, the sensor may detect that a bathroom light is switched on and this is used as an indication of the presence of the user.

In an embodiment, the adaptive lighting system 100 comprises an ambient light level sensor 114 that is configured and adapted to sense an illumination level of an ambient of the mirror component. The controller 104 may be coupled to the ambient light level sensor 114 for receiving information about the sensed illumination level over the ambient. The controller 104 may be configured to take into account the sensed illumination level while generating the control signals 121 . . . 129. The control signals 121 . . . 129 indicate larger reduction of the emission of light towards the eyes of the user if the sensed illumination level is relatively low and the control signals indicate a smaller reduction of the light emission towards the eyes of the user if the sensed illumination level is relatively high.

Figure 2:
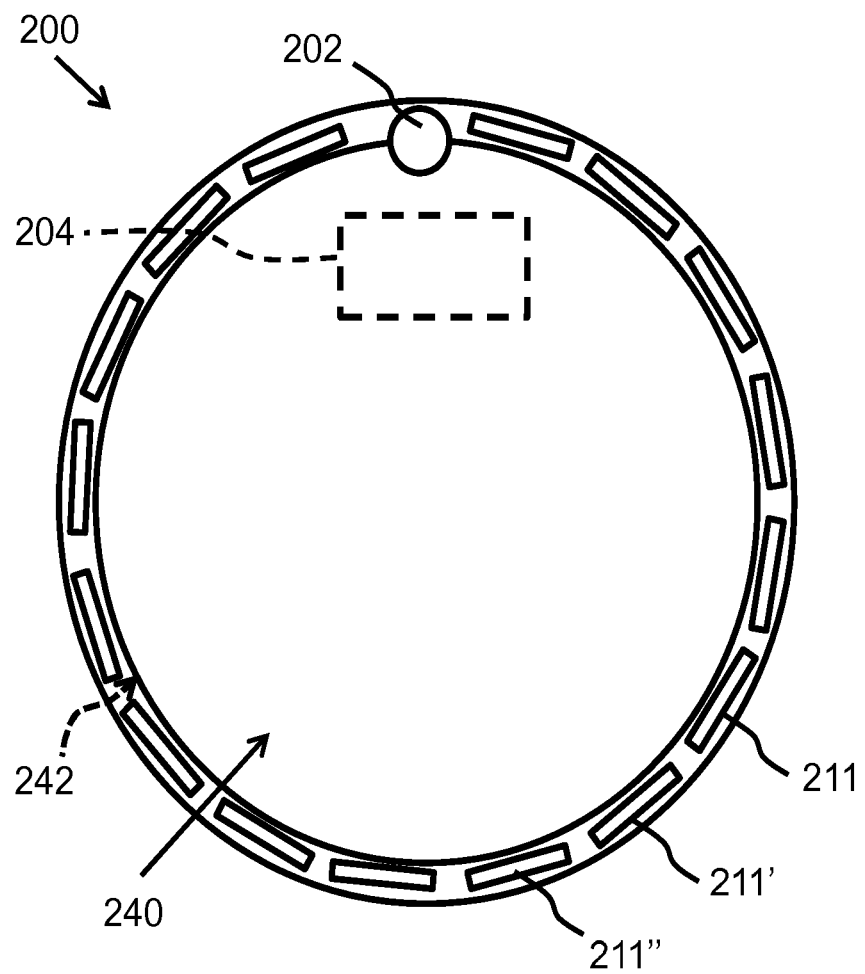

FIG. 2 schematically shows an embodiments of a mirror arrangement 200. The mirror arrangement 200 comprises a mirror 240 and an embodiment of an adaptive lighting system 100 as discussed in the context of FIG. 1. The mirror 240 has a specularly reflective surface that presents a mirror image to a user that positions his head 460 in front of the mirror 240. The mirror 240 forms a mirror component and the specularly reflective surface of the mirror is the mirror surface of the embodiments discussed in the context of FIG. 1. The outer edge of the mirror 240 defines a circumference 242 of the mirror 240. For example, a plurality of individually controllable light sources, 211, 211', 211", etc. are arranged around the circumference 242 of the mirror 240. At a top of the mirror arrangement 200 is provided an eye of a camera 202. The camera 202 is directed towards a space that is in front of the mirror 240 and obtains images of, for example, the head of the user that is in front of the mirror 240. The mirror arrangement 200 also comprises a controller 204 that may be arranged behind the mirror 240 and the controller 204 may be coupled to the camera 202 and to the plurality of individually controllable light sources 211, 211', 211", etc. In the context of FIG. 1, the image processing unit 112 has been discussed that is comprised in, together with the camera 110, a sensor 102. It is to be noted that the function of or the tasks of the image processing unit 112 may also be performed by or executed by the controller 204. In line with the discussion of FIG. 1, if the head 460 of the user is in front of the mirror 240, and if the user turns his head in, for example, a bottom—right sidewards direction, his eyes move closer to the subgroup of light sources of which the light sources have been indicated with 211, 211', 211" in FIG. 2. If this movement is observed by the camera 202 and detected by the controller 204, the controller 204 may generate control signals for the light sources 211, 211', 211" which indicate that they have to reduce their light emission. According to an embodiment of the adaptive lighting system, the light source that are at an opposite side of the mirror 240 may then be controlled to increase their light illumination.

The mirror arrangement 200 of FIG. 2 is, for example, a vanity mirror that is often used for shaving or for applying or removing make-up.

Figure 3:
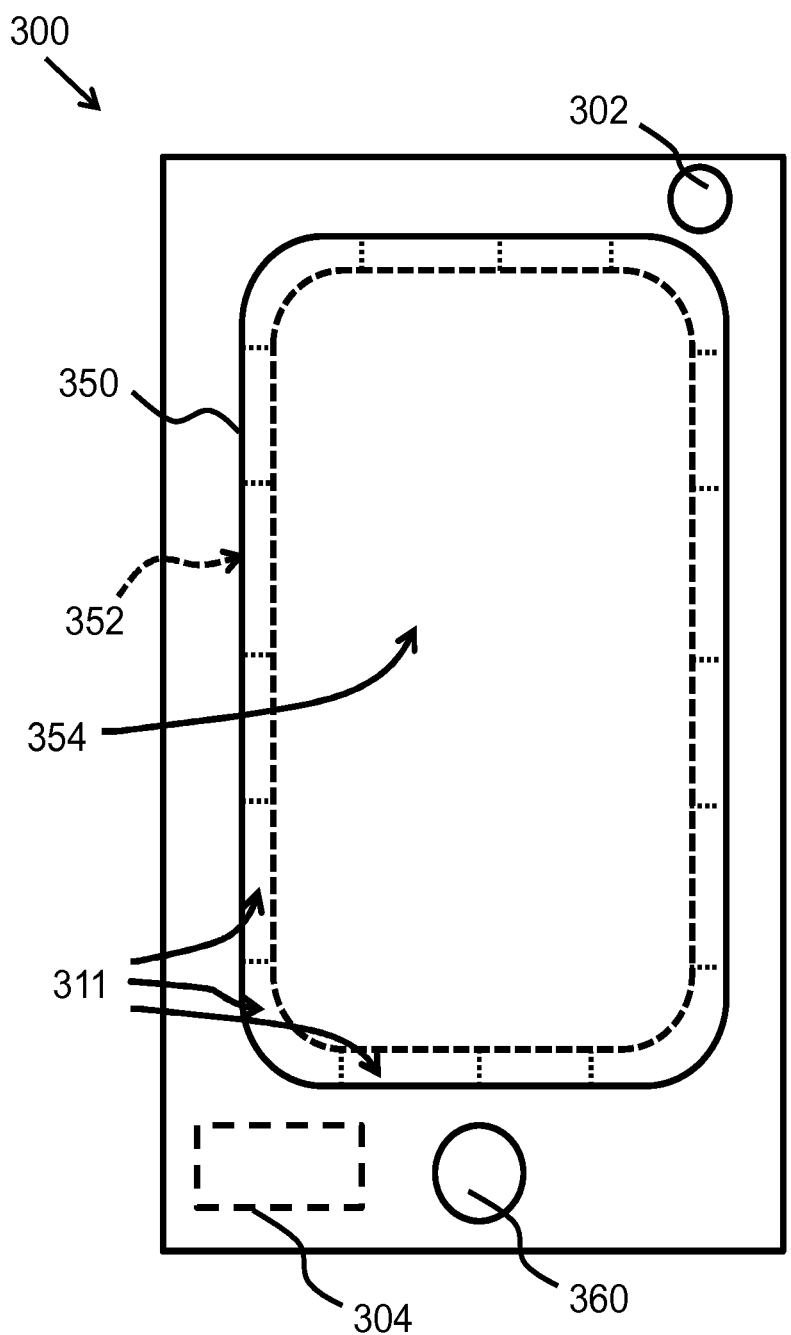

FIG. 3 schematically shows an embodiment of a virtual mirror arrangement 300. The virtual mirror arrangement 300 is, for example, provided by a mobile phone that comprises a display 350, a camera 302, a processor 304 and, for example, a button 360. An embodiment of the adaptive lighting system 100 that has been discussed previously may be implemented on the virtual mirror arrangement 300. The camera 302 obtains images of a space in front of the display 350 and the obtained images are presented on a relatively large central portion 354 of the display 350 as a mirror image. Thus, if a user positions his head in front of the virtual mirror arrangement 300, he can see his own face on the portion 354 of the display 350. An edge or a circumference of the display 350 is indicated in FIG. 3 by a numeral 352. Areas of the display 350 near the circumference 352 are controlled by the processor 304 to operate as individually controllable light sources 311. The processor 304 may, for example, control the color of the pixels of the areas of the display 350 near the circumference 352 to be white at a relatively high light emission level and, thereby, the areas of the display 350 near the circumference 352 of the display 350 act as the light sources 311 that illuminate the face of the person who positions his head in front of the virtual mirror arrangement 300. In line with the discussed embodiments of the adaptive lighting system 100, the illumination levels of the areas of the display 350 near the circumference 352 are controlled based on a relative orientation of the head of the user with respect to the virtual mirror arrangement 300. The user may turn his head, or the user may move the virtual mirror arrangement 300 around the head to inspect, for example, a side surface of the head. The processor 304 of the virtual mirror arrangement 300 may execute a computer program that implements the functions of the image processing unit 112 of the sensor 102 of the adaptive lighting system 100 and the controller 104 of the adaptive lighting system 100. Then the processor 304 may detect a turning of the head with respect to the display and then may reduce an illumination level of some of the areas/light sources 311 of the display 350 that act as controllable light sources, in particular, the light emission of the areas/light sources 311 closest to the eyes of the user is reduced.

Figure 5:
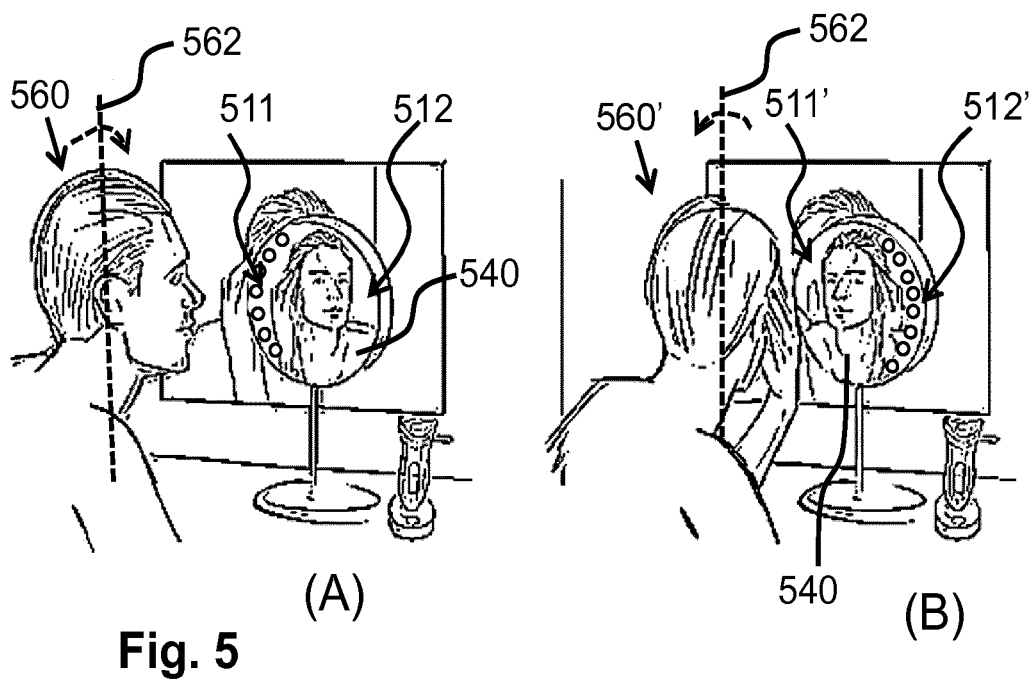

FIG. 5 schematically shows the adaptive lighting system 100 of the mirror arrangement 200 in operation. In FIG. 5, a typical bathroom setting is drawn in which, for example during shaving, a user positions his head 560/560' in front of a vanity mirror 540. In FIG. 5 an axis 562 is indicated which is, in the context of FIG. 4, the z-axis 462. At the left side (A) the user has turned his head 560 in a right-sideward direction—the head 560 has been rotated clockwise around the axis 562. At the right side (B) the user has turned his head 560' in a left-sideward direction—the head 560' has been rotated counter-clockwise around the axis 562. In the example of FIG. 5, the vanity mirror 540 is, for example, half translucent. A plurality of individually controllable light sources 111 . . . 119 are provided behind the half translucent vanity mirror 540 and are arranged close to an edge of the vanity mirror 540. Also a camera 110 may be provided behind the half translucent mirror 540. The camera 110 obtains images of a space in front of the vanity mirror 540 and thus, in use, of the head 560, 560' of the user. An image processing unit 112 detects whether the user turned his head leftwards, rightwards, upwards and/or downwards. If it has been detected that the user turned his head 560, 560', a controller 104 of the adaptive lighting system 100 controls at least a portion of the light sources 111 . . . 119 that are relatively closest to the eyes of the user to emit less light and, optionally, to control another portion of the light sources to emit more light. For example, it is shown at (A) that, if the user turns his head 560 in the rightward direction, a portion 512 of the light sources 111 . . . 119, which are the light sources arranged near a right edge of the vanity mirror 540, are controlled to emit a relatively low amount of light (which is schematically shown by not drawing any visible indication of the light sources). Thus, the portion 512 of the light sources 111 . . . 119, which are the light sources that are closest to the eyes of the turned head 560, are dimmed. It is to be noted that dimming may mean that the portion 512 of the light sources 111 . . . 119 are either switched off or the amount of light emitted by the portion 512 of the light sources 111 . . . 119 is reduced compared to the situation wherein the head 560 of the user is not turned. For example, it is shown at (A) that, if the user turns his head in the rightward direction, that a portion 511 of the light sources 111 . . . 119, which are the light sources that are arranged near a left edge of the vanity mirror 540, are controlled to emit a relatively high amount of light (which is schematically shown by drawing the light sources as clearly visible circles). For example, it is shown at (B) that, if the user turns his head 560' in the leftward direction, a portion 512' of the light sources, which are the light sources that are arranged near a right edge of the vanity mirror 540, are controlled to emit a relatively high amount of light. For example, it is shown at (B) that, if the user turns his head 560' in the leftward direction, a portion 511' of the light sources, which are the light sources that are arranged near a left edge of the vanity mirror 540, are controlled to emit a relatively low amount of light. In both the situations (A) and (B) the eyes of the user receive less light from the light sources of the vanity mirror 540 and, thus, glare is prevented. In both the situations (A) and (B) the side of the head 560, 560' that faces towards the vanity mirror 540 receives a relatively high amount of light such that it is well illuminated and then the user is well able to inspect that side of the head 560, 560'.

Figure 6:
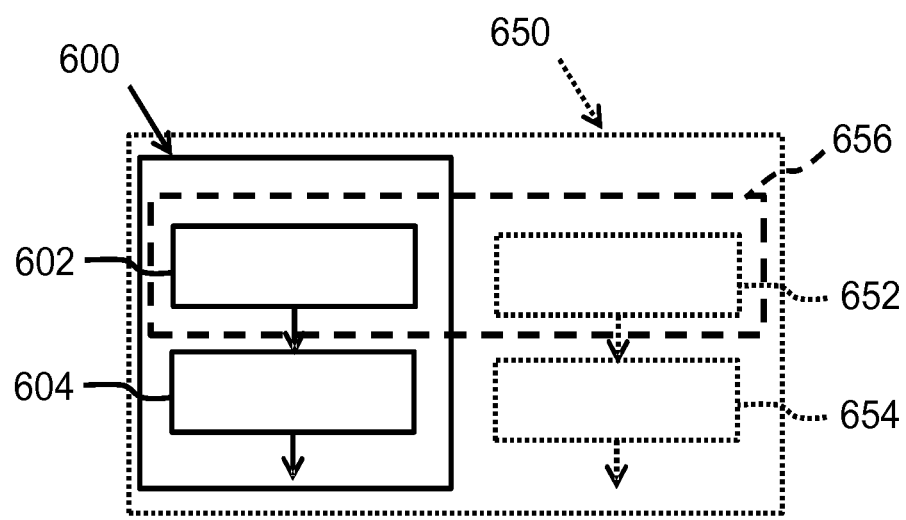

FIG. 6 schematically shows an embodiment of a method 600 of controlling light sources of an adaptive lighting system and an embodiment of a method 650 of controlling a virtual mirror. The method 600 of controlling light sources of the adaptive lighting system comprises: i) detecting 602 a relative orientation of the head of the user with respect to the mirror surface and generating a sensor signal indicating whether a head of an user is turned into a specific direction with respect to a mirror surface, the specific direction comprises at least one of: the head is turned in an upwards or downwards direction with respect to mirror surface, the head is turned in a left sideward or a right sideward direction and the head is arranged towards the mirror surface; and ii) generating 604 control signals for the individually controllable light sources on the basis of the sensor signal, wherein the generation of the control signals is performed such that a lower light emission of light towards eyes of the user is obtained if the sensor signal indicates that the head is turned left sidewards, upwards, right sidewards and/or downwards. The method 650 of controlling the virtual mirror comprises a) the method 600 of controlling light sources of an adaptive lighting system; b) obtaining 652 an image of the head of the user in front of a display, the display being arranged to act as a mirror surface; and c) presenting 654 the image of the head of the user on a portion of the display. In this context, it is to be noted that the stages of detecting 602 a relative orientation of the head of the user and of obtaining 652 the image of the head of the user may be combined in a stage of obtaining 656 the image of the head of the user in front of the display and detecting in the obtained image the relative orientation of the head of the user.

Figure 7:
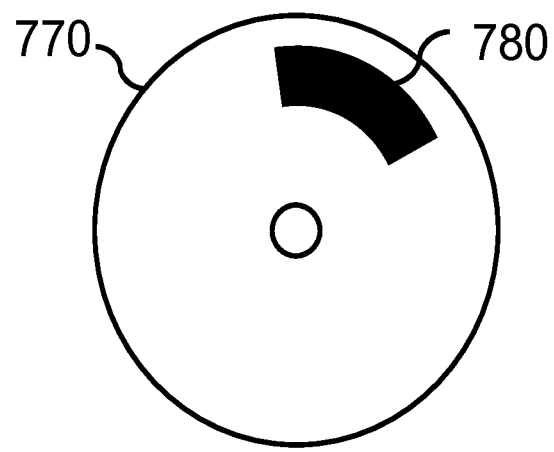

FIG. 7 schematically shows an embodiment of a computer program product 770 that comprises a computer program 780. The computer program product 770 is for controlling light sources of an adaptive lighting system for a mirror component. The program 780 is operative to cause a processor to perform an embodiment of the method 600 of controlling light sources of an adaptive lighting system. Optionally, the computer program product 770 is for controlling a virtual mirror and then the program 780 is operative to cause a processor to perform an embodiment of the method 650 of controlling the virtual mirror.

Embodiments extend to computer program products 770, particularly computer programs 780 on or in a carrier, adapted for putting the invention into practice. The computer program product may comprises a computer program 780. The program may be in the form of source code, object code, a code intermediate source and object code such as partially compiled form, or in any other form suitable for use in the implementation of the one of the above discussed methods. It will also be appreciated that such a program may have many different architectural designs. For example, a program code implementing the functionality of the method or device may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product 770 comprises computer executable instructions 780 corresponding to each of the processing steps of at least one of the methods set forth. These instructions may be subdivided into subroutines and/or be stored in one or more files that may be linked statically or dynamically. Another embodiment relating to a computer program product 770 comprises computer executable instructions 780 corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

The computer program 780 may be a computer program for a distributed processor system and may comprise computer code which causes a first processor system to perform a subset of the steps of the above discussed method and which causes a second processor system to perform another subset of the steps of the above discussed method. The subset of steps and the another subset of steps may be mutually exclusive.

In summary, an adaptive lighting system, a (virtual) mirror arrangement, a method of controlling light sources of an adaptive light sources, a method of controlling a virtual mirror and a computer program product are provided. The adaptive lighting system is for a mirror component that is configured to show a mirror image of the user at the mirror surface of the mirror component. The adaptive lighting system comprises a plurality of individually controllable light sources, a sensor, and a controller. The sensor detects a relative orientation of the head of the user with respect to the mirror surface. The controller generates control signals for the individually controllable light sources on the basis of the sensor signal. The controller generates the control signals to obtain a lower emission of light towards eyes of the user if the sensor signal indicates that the head is turned left sidewards, upwards, right sidewards and/or downwards.

It is to be noted that the invention may be implemented in hardware and/or software, using programmable components. A method for implementing the invention has the steps corresponding to the functions defined for the system as described with reference to FIG. 1.

The invention claimed is:

1. An adaptive lighting system for a mirror component configured to show a mirror image of a user at a mirror surface, the adaptive lighting system comprising
a plurality of individually controllable light sources for being positioned at positions at or near at least a portion of a circumference of the mirror surface or for being positioned behind a half translucent mirror surface, wherein said light sources are arranged to emit, in use, light towards a head of the user being in front of the mirror surface,
a sensor for detecting a relative orientation of the head of the user with respect to the mirror surface, the sensor being configured to provide a sensor signal indicating whether the head of the user is turned into a specific direction with respect to the mirror surface, the specific direction comprises at least one of: the head is turned in an upwards or downwards direction with respect to the mirror surface, the head is turned in a left sideward or a right sideward direction and the head is arranged towards the mirror surface,
characterized in that the adaptive lighting system further comprises
a controller being configured to generate control signals for the plurality of individually controllable light sources on the basis of the sensor signal, wherein the controller being configured to generate the control signals to obtain a lower emission of light by light sources closest to the eyes of the user if the sensor signal indicates that the head is turned left sidewards, upwards, right sidewards and/or downwards.

2. An adaptive lighting system according to claim 1, wherein the controller is configured to generate the control signals indicating that a portion of said light sources that are closest to the eyes of the user have to emit less light if the head is turned left sidewards, upwards, right sidewards and/or downwards.

3. An adaptive lighting system according to claim 2, wherein the controller is further configured to generate the control signals indicating that opposite light sources have to emit more light towards the head, the opposite light sources are a subset of said light sources that are, seen along the circumference of the mirror surface, arranged opposite to the portion of the light sources that are closest to the eyes.

4. An adaptive lighting system according to claim 1, wherein said light sources are adapted to control at least one of a width of an emitted light beam and a direction of the emitted light beam, and the controller is configured to generate the control signals indicating that a portion of the light sources that emit, in use, light towards the eyes of the user have to adapt at least one of the direction of the emitted light beam and the width of the emitted light beam to obtain the lower emission of light towards the eyes of the user.

5. An adaptive lighting system according to claim 1, wherein
the controller is further configured to store user profiles that include at least one characteristic of the user and a glare sensitivity indicator belonging to the user,
the sensor is further configured to detect the at least one characteristic of the user if the user is in front of the mirror component and to include the detected information in the sensor signal,
the controller is further configured to select a stored user profile on the basis of the characteristics of the user as provided by the control signal, and to use the glare sensitivity indicator of the selected user profile to generate the control signals, wherein the control signals indicate a larger reduction of the emission of light towards the eyes of the user if the glare sensitivity indicator indicates that the user is relatively sensitive to glare and a smaller reduction of the emission of light towards the eyes of the user if the glare sensitivity indicator indicates that the user has a relatively low sensitivity to glare.

6. An adaptive lighting system according to claim 1 wherein the sensor is further configured to detect a distance (D) between the user being present in front of the mirror component and the controller is further configured to generate the control signals indicating an amount of light to be emitted by said light sources based on the detected distance (D).

7. An adaptive lighting system according to claim 1, wherein the sensor comprises
a camera being arranged to obtain images of the head of the user if the user is in front of the mirror component,
an image processing unit being coupled to the camera, the image processing unit being configured to recognize the head of the user in the images, to detect a relative orientation of the head with respect to the mirror surface in the images, and to generate the sensor signal.

8. An adaptive lighting system according to claim 1 further comprising a low power user presence sensor for detecting whether the user is present in front of the mirror component and wherein the sensor and/or the controller is switched on or off based on the detection of the user in front of the mirror component.

9. An adaptive lighting system according to claim 1 further comprising an ambient light level sensor for sensing an illumination level of the ambient of the mirror component and wherein the controller is configured to take into account the sensed illumination level while generating the control signals, wherein the control signals indicate a larger reduction of the emission of light towards the eyes of the user if the sensed illumination level is relatively low and a smaller reduction of the emission of light towards the eyes of the user if the sensed illumination level is relatively high.

10. A mirror arrangement comprising
a mirror,
the adaptive lighting system according to claim 1, wherein the mirror component is formed by the mirror and the mirror surface is the reflective surface of the mirror.

11. A virtual mirror arrangement comprising
a display,
a camera being arranged to record images from a space in front of the display,
a processor being coupled to the camera and the display, and
the adaptive lighting system according to claim 1 wherein the camera and the processor are configured to implement the sensor of the adaptive lighting system,
the display and the processor are also configured to present the images recorded by the camera as a mirror image on at least a portion of the display.

12. A virtual mirror arrangement according to claim 11, wherein either the plurality of individually controllable light sources are provided at or near at least a portion of the circumference of the display,
or the display and the processor are also configured to use portions of the display being located at or near the circumference of the display as the plurality of individually controllable light sources.

13. Method of controlling light sources of an adaptive lighting system for a mirror component configured to show a mirror image of a user at a mirror surface of the mirror component, the method comprising detecting a relative orientation of a head of the user with respect to the mirror surface and generating a sensor signal indicating whether the head of the user is turned in a specific direction with respect to the mirror surface, the specific direction comprises at least one of: the head is turned in an upwards or downwards direction with respect to the mirror surface, the head is turned in a left sideward or a right sideward direction and the head is arranged towards the mirror surface, characterized in that the method further comprises the step of generating control signals for individually controllable light sources on the basis of the sensor signal, wherein the generation of the control signals is performed to obtain a lower emission of light by light sources closest to the eyes of the user if the sensor signal indicates that the head is turned left sidewards, upwards, right sidewards and/or downwards.

14. A method of controlling a virtual mirror, the method comprising the method of controlling light sources of the adaptive lighting system according to claim 13, obtaining an image of the head of the user in front of a display, the display being arranged to act as the mirror surface, presenting the image of the head of the user on a portion of the display, wherein the obtained image of the head is also used in the stage of detecting a relative orientation of the head of the user with respect to the mirror surface.

15. A computer program product for controlling light sources of an adaptive lighting system for a mirror component, which program is operative to cause a processor to perform the method as claimed in claim 13.

\* \* \* \* \*